3,010,946
NOVEL INTERPOLYMERS
Albert Y. Garner, Springfield, Mass., assignor to Monsanto Chemical Company, St. Louis, Mo., a corporation of Delaware
No Drawing. Filed Apr. 8, 1959, Ser. No. 804,868
11 Claims. (Cl. 260—78.4)

This invention relates to novel phosphorus containing polymers. More particularly, it relates to linear polyphosphines and methods for their preparation.

The technology of phosphorus polymers has heretofore remained relatively undeveloped. However, with the present availability of phosphorus containing intermediates, phosphorus polymers are growing increasingly attractive for use in specialized applications wherein their novel properties may be advantageously utilized.

It is an object of this invention to provide novel phosphorus containing polymers.

Another object is the provision of novel linear polyphosphine and a process for their manufacture.

A further object is the provision of novel flame-resistant polymers.

These and other objects are attained by copolymerizing a diene monomer free of aliphatic conjugation and a mono-substituted phosphine under an inert atmosphere in the presence of free radicals.

The following examples are given in illustration of the invention and are not intended as limitations thereon. Where parts are mentioned, they are parts by weight.

*Example I*

Forty parts (about 0.5 mol) of diallyl and 55 parts (about 0.5 mol) of phenylphosphine are charged to a 500 ml. flask equipped with a reflux condenser. The mixture is placed under a nitrogen atmosphere and is irradiated with ultraviolet light for about 30 hours, maintaining a temperature of about 20° C. throughout. Unreacted monomers are removed from the resulting reaction mixture by vacuum distillation at about 2 mm. of mercury pressure. A colorless viscous interpolymer containing about 15.4% phosphorus by weight is obtained. The interpolymer is soluble in acetone and methanol. Testing for inflammability using a Meeker burner, the interpolymer is found to be self-extinguishing upon removal from the flame.

*Example II*

Fifty parts (about 0.5 mol) of diallyl ether, 55 parts (about 0.5 mol) of phenylphosphine and 0.5 part of dibenzoyl peroxide are charged to a 250 ml. flask equipped with a reflux condenser. The reaction mixture is placed under a nitrogen atmosphere and heated to a temperature of 70° C., which temperature is maintained for about 90 hours. Unreacted monomers are removed from the resulting reaction mixture by distillation under a nitrogen atmosphere. A tough flexible interpolymer containing about 14.0% phosphorus by weight is obtained. The interpolymer is soluble in methanol. Testing for inflammability using a Meeker burner, the interpolymer is found to be self-extinguishing upon removal from the flame.

*Example III*

Fifty-five parts (about 0.5 mol) of phenylphosphine are charged to a 500 ml. flask equipped with a reflux condenser. The contents are placed under a nitrogen atmosphere and heated to a temperature of 50° C. Maintaining the nitrogen cover and a temperature of 50±5° C., the reaction system is irradiated with ultraviolet light while a solution of 65 parts of p-divinylbenzene dissolved in 100 ml. of dioxane are slowly charged to the flask over an 8 hour period. After all of the p-divinylbenzene solution has been charged, the reaction temperature is raised to 100° C. and the irradiation is continued for an additional 20 hours. The resulting reaction mixture is poured into an excess of methanol to precipitate solids. A hard, rigid interpolymer containing about 11.9% phosphorus by weight is obtained. The interpolymer is soluble in benzene and dioxane. Testing for inflammability using a Meeker burner, the interpolymer is found to be self-extinguishing upon removal from the flame.

*Example IV*

Sixty-five parts (about 0.5 mol) of p-divinylbenzene, 60 parts (about 0.5 mol) of cyclohexylphosphine and 1 part of azo-bis-isobutyronitrile are charged to a 500 ml. flask equipped with a reflux condenser. The reaction mixture is placed under a nitrogen atmosphere and heated to an initial reaction temperature of about 80° C., which is maintained for about 6 hours. Thereafter, the reaction temperature is increased slowly, over a 5 hour period, to about 230° C. where it is maintained for an additional 3 hours. Unreacted monomers are removed by heating at 230° C. for another 5 hours under a pressure of 0.1 mm. of mercury. A hard, rigid interpolymer containing about 12.0% phosphorus by weight is obtained. The interpolymer is soluble in hot xylene. Testing for inflammability using a Meeker burner, the interpolymer is found to be self-extinguishing upon removal from the flame.

The diene monomers employed in the practice of this invention correspond to the general formula:

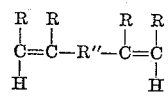

Each R group may be, independently, either hydrogen or an alkyl radical containing from 1–4 carbon atoms. In a preferred embodiment, all four R groups are hydrogen radicals. R'' may be (a) an alkylene radical containing from 1–5 carbon atoms, (b) an arylene radical containing from 6–14 carbon atoms or, in various other embodiments, a radical corresponding to one of the following formulae:

(c) —O—
(d) —CH$_2$—O—CH$_2$—

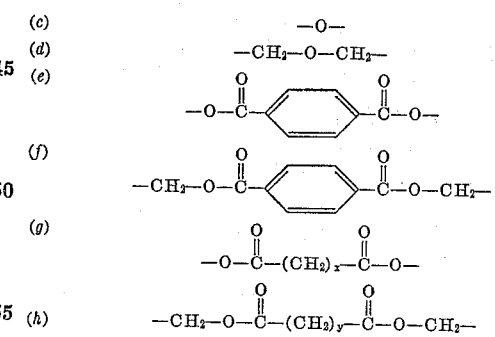

In the above formulae, x and y are integers of from 1–8. Therefore, in place of the divinylbenzene, diallyl and diallyl ether employed in the examples may be substituted. For example, 1,4-pentadiene, 1,6-heptadiene, 1,9-nonadiene, 2,4-dimethyl-1,4-pentadiene, 3,5-dimethyl-2,5-heptadiene, divinyl naphthalene, divinyl anthracene, divinyl ether, dimethallyl ether, di-isobutylallyl ether, 1,4-bis(isopropenyl)ether, divinyl phthalate, diallyl phthalate, bis(ethylallyl)phthalate, divinyl malonate, bis(isopropenyl)succinate, divinyl adipate, divinyl suberate, divinyl sebacate, diallyl malonate, diallyl succinate, diallyl adipate, diallyl sebacate, etc., with equivalent results. Mixtures of such diene monomers may also be employed.

The mono-substituted phosphines employed in the practice of this invention correspond to the general formula:

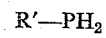

wherein R' is a hydrocarbon radical containing from 1-12 carbon atoms. In place of the phenylphosphine employed in the examples may be substituted, for example, methylphosphine, ethylphosphine, propylphosphine, isobutylphosphine, n-butylphosphine, n-hexylphosphine, cyclohexylphosphine, benzylphosphine, tolylphine, iso-octylphosphine, decylphosphine, dodecylphosphine, etc., with equivalent results. However, the pyrophoric nature of the lower molecular weight alkylphosphines necessitates the use of extreme care in their handling.

The linear polyphosphines of this invention are prepared by reacting substantially equimolar proportions of the diene monomer and the mono-substituted phosphine in a substantially oxygen-free atmosphere, e.g., nitrogen, etc. However, up to a 10% molar excess of either component may be employed to control the nature of the terminal groups on the polymeric chains. That is, the diene monomer and the mono-substituted phosphine are coreacted in molar proportions of from 40-60% of diene monomer to 60-40% of mono-substituted phosphine.

The reaction proceeds by a free radical mechanism; the free radicals being generated from the monomers themselves under the influence of heat or irradiation with e.g., actinic light, X-rays, atomic radiation, etc., or by free radical generating compounds charged to the reaction mixture. Temperature is a factor only as regards the generation of free radicals in the absence of irradiation. In such instances, reaction temperatures within the activation temperature range of the particular free radical source employed should be used. Conventional free radical initiators may be used in concentrations of up to about 5% by weight, based upon total weight of reactants. These include, for example, peroxides such as benzoyl peroxide, dibenzoyl peroxide, hydrogen peroxide, ditertiarybutylperoxide, cumene hydroperoxide, acetyl peroxide, etc., azo compounds such as azo-bis-isobutyronitrile, etc., hydrazines, etc.

Although the use of a solvent is not normally required, it may be advantageous in certain instances to employ an inert organic solvent to insure fluidity and homogeneity of the reaction mixture. Suitable solvents include, for example, hydrocarbons such as benzene, toluene, xylene, etc.; halobenzenes such as chlorobenzene, p-bromotoluene, etc.; dioxane; etc.

The linear polyphosphines produced according to the teachings of this invention may be obtained in up to 100% yield depending upon the monomeric proportions and the reaction conditions employed. Any unreacted monomers or solvent present in the final product may be removed using conventional techniques, using care to avoid oxidation of the polymeric phosphine groups in so doing. Thus, distillation, either under vacuum or an inert atmosphere, will effectively remove the solvent and possibly a portion of any residual monomer present. The polymeric product may effectively be separated from residual monomer by pouring a solution of the polymer into an excess of a non-solvent such as ether.

These linear polyphosphines contain the diene and mono-substituted phosphine components in approximately the same proportions as in the initial monomeric charge. They range in molecular weight from about 500-500,000, as determined by the weight average method, depending upon the reaction conditions employed. The lower molecular weight polyphosphines are generally viscous fluids while those of higher molecular weight are generally solids, ranging from soft and flexible to tough and rigid. In most instances they are self-extinguishing.

The linear polyphosphines of this invention find wide and varied application. For example, they are useful as anti-oxidants when incorporated into other resinous materials, such as, e.g., synthetic or natural rubber, styrene or substituted styrene polymers, vinyl esters such as polyvinyl chloride, polyvinyl acetate, etc., acrylic polymers such as polyacrylonitrile, polymethylmethacrylate, etc., etc. or copolymers thereof. Or they may be employed as flame-proofing agents in textiles, wood, paper, etc. The fluid polyphosphines are admirably suited for use as hydraulic fluids in critical applications, e.g., aircraft, etc. or as adhesives. The solid polyphosphines may be extruded or cast as films, sheets, tubing, etc., for e.g., electrical insulation, fire barriers, surface coatings, etc.

*Example V*

A rectangular chip of ponderosa pine measuring about ¼" x 1" x 3" is immersed for 4 hours in 100 ml. of a 75% by weight solution of the interpolymer obtained in Example I dissolved in benzene. The pine chip is then heated in an air oven at 80° C. for about 3 hours to remove all adsorbed solvent. Testing for flammability, the pine chip is found to be incapable of supporting combustion.

The linear polyphosphines of this invention may be modified by the incorporation therein of conventional additives such as dyestuff fillers, extenders, stabilizers, lubricants, etc. They may be used alone or in combination with other polymeric materials, e.g., with vinyl, vinylidene, aminoplast, phenolic, etc. polymers.

It is obvious that many variations may be made in the products and processes set forth above without departing from the spirit and scope of this invention.

What is claimed is:

1. A linear polyphosphine consisting of from 40-60 mol percent of a diene monomer and from 60-40 mol percent of a mono-substituted phosphine in interpolymerized form; said mono-substituted phosphine corresponding to the general formula:

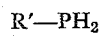

wherein R' is a hydrocarbon radical free of ethylenic and acetylenic unsaturation containing from 1-12 carbon atoms, and said diene monomer corresponding to the general formula:

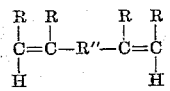

wherein the R groups are radicals independently selected from the group consisting of hydrogen and alkyl radicals containing from 1-4 carbon atoms and R" is a radical selected from the group consisting of (a) alkylene radicals containing from 1-5 carbon atoms, (b) arylene radicals containing from 6-14 carbon atoms, (c) —O—
(d) —CH$_2$—O—CH$_2$—
(e)

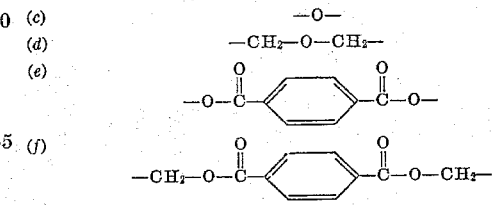

(f)

(g) radicals corresponding to the general formula:

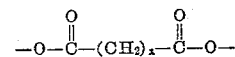

wherein x is an integer of from 1-8 and (h) radicals corresponding to the general formula:

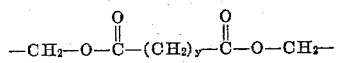

wherein y is an integer of from 1-8.

2. A linear polyphosphine as in claim 1 wherein the diene monomer is divinyl benzene.

3. A linear polyphosphine as in claim 1 wherein the diene monomer is diallyl.

4. A linear polyphosphine as in claim 1 wherein the diene monomer is diallyl ether.

5. A linear polyphosphine as in claim 1 wherein the mono-substituted phosphine is phenylphosphine.

6. A linear polyphosphine as in claim 1 wherein the diene monomer is divinyl benzene and the mono-substituted phosphine is phenylphosphine.

7. A linear polyphosphine as in claim 1 wherein the diene monomer is diallyl and the mono-substituted phosphine is phenylphosphine.

8. A linear polyphosphine as in claim 1 wherein the diene monomer is diallyl ether and the mono-substituted phosphine is phenylphosphine.

9. A process for preparing the linear polyphosphines of claim 1 which comprises copolymerizing from 40-60 mol percent of a diene monomer and from 60-40 mol percent of a mono-substituted phosphine under an inert atmosphere in the presence of free radicals; said mono-substituted phosphine corresponding to the general formula:

$$R'-PH_2$$

wherein R' is a hydrocarbon radical free of ethylenic and acetylenic unsaturation containing from 1-2 carbon atoms and said diene monomer corresponding to the general formula:

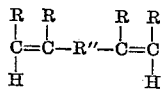

wherein each R group is independently selected from the group conisting of hydrogen and alkyl radicals containing from 1-4 carbon atoms and R″ is a radical selected from the group consisting of (a) alkylene radicals containing from 1-5 carbon atoms, (b) arylene radicals containing from 6-14 carbon atoms, (c) —O—
(d) —CH₂—O—CH₂—
(e) 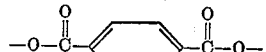
(f) 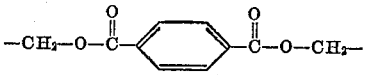

(g) radicals corresponding to the general formula:

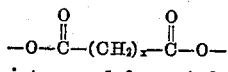

wherein $x$ is an integer of from 1–8 and (h) radicals corresponding to the general formula:

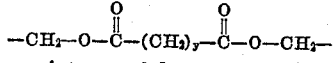

wherein $y$ is an integer of from 1–8.

10. A process as in claim 9 wherein the free radicals are generated from the reactants themselves by irradiation thereof with actinic light.

11. A process as in claim 9 wherein the free radicals are generated by a free radical initiator present in a concentration of up to 5% by weight based upon the total weight of the reactants.

References Cited in the file of this patent
UNITED STATES PATENTS
2,671,080     McCormack _____ Mar. 2, 1954

UNITED STATES PATENT OFFICE
CERTIFICATE OF CORRECTION

Patent No. 3,010,946                              November 28, 1961

Albert Y. Garner

It is hereby certified that error appears in the above numbered patent requiring correction and that the said Letters Patent should read as corrected below.

Column 3, lines 6 and 7, for "tolylphine" read -- tolylphosphine --; line 19, for "dine" read -- diene --; column 5, line 21, for "1-2" read -- 1-12 --.

Signed and sealed this 1st day of May 1962.

(SEAL)
Attest:

ERNEST W. SWIDER                            DAVID L. LADD
Attesting Officer                              Commissioner of Patents